(12) United States Patent
Addiego et al.

(10) Patent No.: US 9,776,891 B2
(45) Date of Patent: Oct. 3, 2017

(54) FILTER AND METHODS FOR HEAVY METAL REMEDIATION OF WATER

(71) Applicant: Corning Incorporated, Corning, NY (US)

(72) Inventors: William Peter Addiego, Big Flats, NY (US); Benedict Yorke Johnson, Horseheads, NY (US); Lingyan Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 271 days.

(21) Appl. No.: 14/804,406

(22) Filed: Jul. 21, 2015

(65) Prior Publication Data

US 2016/0023922 A1    Jan. 28, 2016

Related U.S. Application Data

(60) Provisional application No. 62/027,576, filed on Jul. 22, 2014.

(51) Int. Cl.
*C02F 1/42* (2006.01)
*B01D 24/00* (2006.01)
(Continued)

(52) U.S. Cl.
CPC .............. *C02F 1/283* (2013.01); *B01J 20/02* (2013.01); *B01J 20/06* (2013.01); *B01J 20/08* (2013.01);
(Continued)

(58) Field of Classification Search
CPC ........ C02F 1/288; C02F 2101/20; C02F 1/28; C02F 1/286; C02F 2305/08; C02F 1/001;
(Continued)

(56) References Cited

U.S. PATENT DOCUMENTS 4,451,517 A * 5/1984 Inoguchi ................ B01D 53/86
                                                      422/180
5,837,136 A * 11/1998 Lee ........................ C02F 1/5236
                                                      106/488
(Continued)

FOREIGN PATENT DOCUMENTS

CA         1333106 C      11/1994
CN        106422656    *  11/2016
(Continued)

OTHER PUBLICATIONS

Derwent Abstract 2017-14331 Y; Gonzales F., Univeristy of Catalunya Politechnica (UYCAN), Jan. 24, 2017.*
(Continued)

*Primary Examiner* — Ana Fortuna
(74) *Attorney, Agent, or Firm* — John L. Haack

(57) ABSTRACT

A liquid filter article, including:
a housing having an inlet, an outlet, and an adsorbent bed there between, the bed comprising:
a first stage having a first adsorbent, the first adsorbent including an activated carbon honeycomb infused with a plurality of zero valent iron nanoparticles ("Fe-AC"); and
a second stage having a second adsorbent, the second adsorbent being selected from iron oxide particles supported on activated carbon honeycomb ("FEOX-AC"), iron oxide particles supported on activated alumina honeycomb ("FeOX-AA"), or a combination thereof, wherein the first stage is in fluid communication with the second stage. Also disclosed is a method of using the liquid filter article to remediate heavy metals in water.

16 Claims, 1 Drawing Sheet

(51) Int. Cl.
  *B01D 24/02* (2006.01)
  *B01D 24/32* (2006.01)
  *B01D 15/02* (2006.01)
  *B01D 27/02* (2006.01)
  *B01D 29/88* (2006.01)
  *C02F 1/28* (2006.01)
  *B01J 20/28* (2006.01)
  *B01J 20/20* (2006.01)
  *B01J 20/02* (2006.01)
  *B01J 20/06* (2006.01)
  *B01J 20/08* (2006.01)
  *C02F 101/20* (2006.01)

(52) U.S. Cl.
  CPC ......... *B01J 20/20* (2013.01); *B01J 20/28009* (2013.01); *B01J 20/28045* (2013.01); *C02F 2101/20* (2013.01)

(58) Field of Classification Search
  CPC .......... B01D 2252/504; B01D 46/0036; B01D 53/1406
  See application file for complete search history.

(56) References Cited

U.S. PATENT DOCUMENTS

| | | | |
|---|---|---|---|
| 6,677,261 B1 | 1/2004 | Addiego et al. | |
| 8,277,767 B2 | 10/2012 | Ariya-Far | |
| 2005/0093189 A1 | 5/2005 | Vo | |
| 2010/0307978 A1 | 12/2010 | Sawyer et al. | |
| 2012/0273431 A1 | 11/2012 | Huang | |
| 2013/0105400 A1 | 5/2013 | Lee et al. | |
| 2013/0277298 A1* | 10/2013 | Sanocki | C02F 1/003 210/282 |
| 2015/0001156 A1* | 1/2015 | Johnson | B01D 39/2037 210/688 |
| 2015/0291446 A1* | 10/2015 | Addiego | B01J 20/02 210/679 |
| 2016/0023921 A1* | 1/2016 | Addiego | B01D 15/265 210/670 |
| 2016/0023922 A1* | 1/2016 | Addiego | C02F 1/283 210/688 |
| 2016/0096137 A1* | 4/2016 | House | B01D 53/04 95/134 |

FOREIGN PATENT DOCUMENTS

| | | | |
|---|---|---|---|
| EP | 575334 A1 | 12/1993 | |
| WO | 2005061099 | 7/2005 | |
| WO | WO 2008/129551 | * 10/2008 | ............... C02F 9/00 |
| WO | 2010005936 | 1/2010 | |

OTHER PUBLICATIONS

International Search Report, issued in connection with corresponding PCT application No. PCT/US2015/041268, Oct. 26, 2015.

Tu, Yao-Jen et al., "Treatment of complex heavy metal wastewater using a multi-staged ferrite process" Journal of Hazardous Materials 209-210 (2012) 379-384.

Singanan et al.,"Biosorption of Cr (III) from aqueous solutions using indigenous biomaterials" International Journal of Environmental Research, vol. 2, No. 2, Spring 2008, pp. 177-182.

* cited by examiner

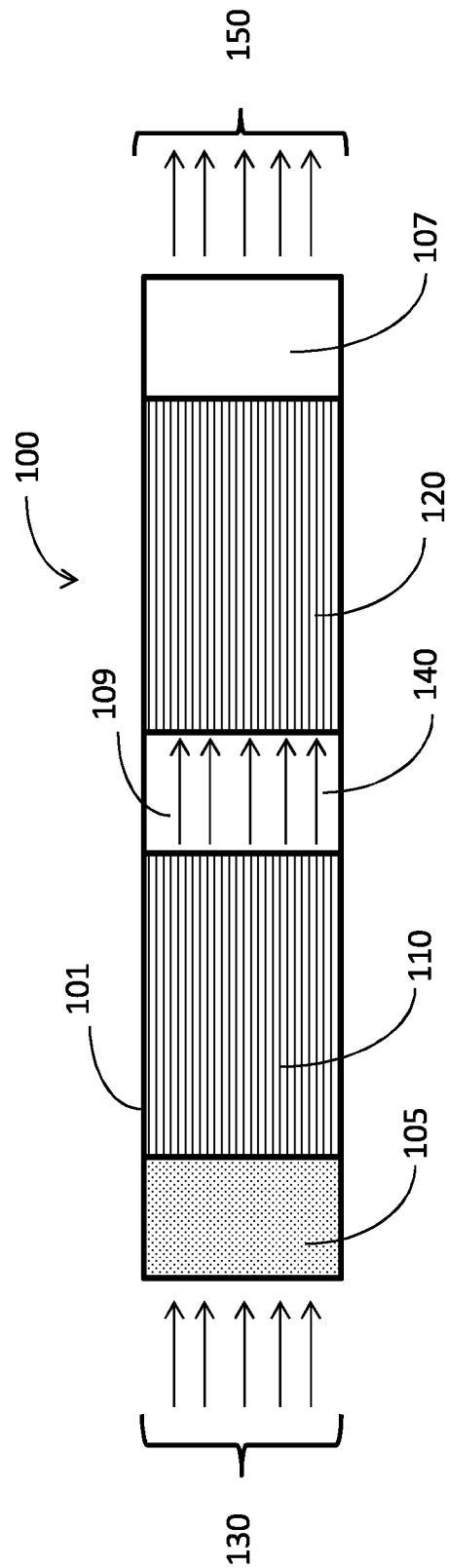

FILTER AND METHODS FOR HEAVY METAL REMEDIATION OF WATER

This application claims the benefit of priority under 35 U.S.C. §119 of U.S. Provisional Application Ser. No. 62/027,576 filed on Jul. 22, 2014 the content of which is relied upon and incorporated herein by reference in its entirety.

The entire disclosure of any publication and patent document mentioned herein is incorporated by reference.

CROSS-REFERENCE TO RELATED APPLICATIONS

The present application is related to, but does not claim priority to, commonly owned and assigned:

U.S. Ser. No. 13/927,857, filed Jun. 26, 2013, entitled "Methods and apparatus for treatment of liquids containing contaminants using zero valent nanoparticles," mentions a method and apparatus that provide an inorganic substrate having at least one surface having a plurality of pores; zero valent nanoparticles deposited on the at least one surface and within at least some of the pores; and a stabilizer engaging the zero valent nanoparticles and operating to inhibit oxidation of the zero valent nanoparticles.

U.S. Ser. No. 14/252,174, filed Apr. 14, 2014, entitled "CO-EXTRUSION METHOD FOR MAKING CARBON-SUPPORTED TRANSITION METAL-BASED NANO-PARTICLES," mentions a method for making carbon-supported transition metal-based nanoparticles, the method comprising: mixing at least one carbon feedstock, at least one transition metal-containing feedstock, at least one organic binder, and at least one resin binder to form a feedstock mixture; extruding the feedstock mixture; and heating the extruded feedstock mixture at a temperature and for a time sufficient to carbothermally reduce the at least one transition metal-containing feedstock. The application also mention technologies that have been employed to fabricate water filters for removing heavy metals from drinking water (i.e., tap water). Extensive testing has been conducted in mixed metal ion solutions to assess the feasibility of the filter samples for heavy metal remediation. The test results showed that the filter samples are very effective for removing heavy metals from water. However, the concentration of iron in the treated water far exceeds the EPA's maximum contaminant level of Fe in drinking water due to, accumulation of Fe (III) species (corrosion products) in the water. The accumulation Fe (III) species also create aesthetic problems including bad taste and discoloration.

U.S. Ser. No. 14/337,621, filed Jul. 22, 2014 (filed concurrently), which is a continuation in-part of U.S. Ser. No. 14/252,174 (SP14-091Z), entitled "ACTIVATED CARBON-SUPPORTED IRON NANOCOMPOSITE FOR ENVIRONMENTAL REMEDIATION," mentions a process for making carbon supported iron or iron oxide nanoparticles and forming them into different shapes.

BACKGROUND

The disclosure relates to a filter article and methods for heavy metal remediation of water with the article.

SUMMARY

In embodiments, the disclosure provides a filter article and methods for heavy metal remediation of water.

BRIEF DESCRIPTION OF THE DRAWING(S)

In embodiments of the disclosure:

FIG. 1 shows a schematic of a filter article having two-stage adsorbent bed for removing toxic metals from a contaminated water stream.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

Growing awareness of the risks posed by heavy metals in the environment has been driving the search for sustainable technologies for the treatment of contaminated sites, particularly drinking water sources such as streams, rivers, lakes, and ground water. Such heavy metal contaminants can include, for example: cadmium, chromium, copper, lead, mercury, nickel, zinc, and semi-metals such as arsenic and selenium. Excessive ingestion of these metals by humans can cause accumulative poisoning, cancer, nervous system damage, and ultimately death. It is desirable for a water supply from a contaminated source be treated to either remove substantially all heavy metals or to reduce the dissolved heavy metals to safe levels.

Nanoscale zero valent iron (NZVI) is emerging as a promising option for removal of heavy metals from contaminated water.

The use of zero valent iron (NVI) nanoparticles is becoming an increasingly popular method for treatment of hazardous and toxic wastes, and for remediation of contaminated water. Because ZVI nanoparticles possess various chemical properties derived from their different oxidation states, they have the ability to degrade a wide variety of toxic pollutants in soil and water, such as perchloroethene (PCE), trichloroethene (TCE), carbon tetrachloride (CT), nitrate, energetic munitions such as TNT and RDX, legacy organohalide pesticides such as lindane and DDT, and heavy metals such as chromium, lead, mercury, cadmium, and other inorganics such as selenium and arsenic. Processes employing ZVI nanoparticles may also provide cost savings compared to conventional pump-and-treat or permeable reactive barrier methods.

Despite impressive advances in NZVI technology within the last decade and its limited commercialization, several barriers have prevented it from becoming a widely adopted remediation option. There are several technical challenges facing the technology with respect to synthesis and application. A main issue for the syntheses of ZVI nanoparticles is the environmental instability. Without any protection, freshly prepared iron nanoparticles often ignite spontaneously upon exposure to air or undergo a rapid exothermic reaction with oxygen under ambient aerobic condition. In aqueous solutions, ZVI nanoparticles suffer rapid iron passivation through non-target reactions. Also in aqueous solutions, ZVI nanoparticles behave as any other nanomaterials: they aggregate and eventually settle so it is difficult to carry out a specific reaction efficiently and effectively. In water treatment and metal recovery applications, NZVI in powder, granular, and fibrous forms are used in batch reactors and column filters. However, ZVI nanoparticles in a reactor or filter rapidly fuses into a mass due to formation of iron oxides. This fusion significantly reduces the hydraulic conductivity of the iron bed. To prevent NZVI aggregation and rapid deactivation, several technologies have been developed in the art that immobilize iron nanoparticles on particulate supports such as silica, sand, alumina, activated carbon, titania, zeolite powder, etc. The main issue with these technologies is that like the free standing NZVI nanoparticles, they require a follow up filtration. Filtration methods including membrane filtration, reverse osmosis, electrodialysis reversal, and nanofiltration can be expensive and difficult to operate. Disposal of the waste that is generated during water treatment is also problematic. Membranes consistently clog and are fouled. Additionally, the particulate support only helps to prevent agglomeration of ZVI nanoparticles but offers no protection against rapid loss of reactivity due to oxidation. An efficient, cost-effective, easy to operate, low maintenance method of removing heavy metals from contaminated water is desirable.

In embodiments, the present disclosure provides a liquid filter article, comprising:
a housing having an inlet, an outlet, and an adsorbent bed there between, the bed comprising:
a first stage having a first adsorbent, the first adsorbent including an activated carbon honeycomb infused with a plurality of zero valent iron nanoparticles ("Fe-AC"); and
a second stage having a second adsorbent, the second adsorbent being selected from iron oxide particles supported on activated carbon honeycomb ("FEOX-AC"), iron oxide particles supported on activated alumina honeycomb ("FeOX-AA"), or a combination thereof, wherein the first stage is in fluid communication with the second stage.

In embodiments, the iron oxide particles in the second stage can be, for example, magnetite.

In embodiments, the plurality of zero valent iron nanoparticles is from 15 to 40 wt % based on the total weight of the activated carbon based honeycomb in the first stage.

In embodiments, the iron oxide particles supported on the activated carbon honeycomb in the second adsorbent can be present, for example, in from 20 to 40 wt % based on the total weight of the activated carbon honeycomb. The liquid filter article can further comprise a high surface area of, for example, from 300 to 4,000 m$^2$ per gram.

In embodiments, the iron oxide particles supported on the activated alumina honeycomb in the second adsorbent can be present, for example, present in from 20 to 40 wt % based on the total weight of the activated alumina honeycomb.

In embodiments, the fluid communication between the first stage and the second stage is direct physical contact between the first and second stage.

In embodiments, the fluid communication between the first stage and the second stage is indirect and having an enclosed spatial gap (140) between the first and second stage.

In embodiments, a flow control material can be selected, for example, from a fiber (e.g., glass wool), a mesh (e.g., woven or non-woven material), granules (such as sand, beads, etc.), a honeycomb structure, static mixing packings, such as rings, balls, miniliths, "Sultzer"-type packings, and like materials, or a combination thereof. The flow control material can be disposed in the article, for example: before (105), after (107), or between (109) the first stage and the second stage. The flow control material facilitates redistribution of the liquid flow into the article, through the article, exiting the article, or a combination thereof.

In embodiments, the disclosure provides a method of removing heavy metals from water using the abovementioned filter article, comprising:
contacting the first stage of the filter and a water influent having, or suspected of having, at least one heavy metal contaminant present; and
contacting the effluent of the first stage of the filter and the second stage of the filter.

In embodiments, the contacting the first stage of the filter and the water influent having at least one heavy metal contaminant removes the at least one heavy metal contaminant from the water.

In embodiments, the contacting the effluent of the first stage of the filter and the second stage of the filter removes exchanged iron from the effluent of the first stage.

In embodiments, the at least one heavy metal contaminant is selected, for example, from cadmium, chromium, copper, lead, mercury, nickel, zinc, semi-metals, and like metals, or a combination thereof.

In embodiments, the contacting the first stage of the filter and the water influent, and contacting the effluent of the first stage of the filter and the second stage of the filter comprises providing relative motion between the filter and the water influent and the effluent.

In embodiments, the contacting the first stage of the filter and the water influent can comprise at least one of any situation that provides for relative motion between the filter article and the liquid being filtered, for example:

actively pumping the water influent (i.e., applying a source of positive pressure to the water) through the first stage;

actively vacuuming the water influent (i.e., applying a source of negative pressure to the filter article) through the first stage;

passively passing (i.e., by action of gravity on the water over the filter article) the water influent through the first stage;

moving the filter article through a column of the water influent;

osmotic or reverse osmotic processes;

or combinations thereof.

In embodiment, the disclosure provides improved methods, compositions, and articles for removing heavy metals from contaminated drinking water streams without significant release of iron into the water streams. In embodiments, the disclosure provides a filter article having a two-stage adsorbent bed for removing heavy metals from contaminated drinking water, and without releasing significant iron into the drinking water. The adsorbent bed comprises an adsorbent material in each adsorption stage selected to provide effective adsorption characteristics for the contaminants present in the water at that stage.

In embodiments, in the first adsorption stage, heavy metal-laden drinking water is passed through a bed of activated carbon (AC) honeycomb infused with zero valent iron nanoparticles (Fe-AC). The Fe-AC adsorbent adsorbs the heavy metals present in the water and releases Fe (III) into the water. The iron-rich water is passed into a second-adsorption stage, which contains an adsorbent material selected for effective adsorption of iron. This second adsorbent is used to strip iron and the remaining heavy metals, and provide a purified drinking water product having a concentration of the toxic metals and iron below their respective maximum contaminant levels (MCLs). The adsorbent material in the second stage can be, for example, an activated carbon honeycomb or an activated alumina honeycomb infused with iron oxide, preferably magnetite.

In embodiments, the disclosure provides improved methods, compositions, and articles, for removing heavy metals from drinking water streams using iron-based adsorbents without releasing significant amount of iron into the water stream.

Referring to the FIGURE, FIG. 1 shows a schematic of an exemplary filter (100) comprised of a housing (101) having a two-stage (110, 120) adsorbent bed for removing toxic metals from a metal contaminated water source (130) or stream. Specifically, a metal contaminated water is introduced into stage one (110) containing adsorbent material A. Adsorbent material A can be, for example, ZVI-nanoparticles supported on activated carbon honeycomb (Fe-AC). Within stage one and adsorbent material A, the toxic metals are adsorbed by Fe-AC, and subsequently or consequently, dissolved and particulate iron are introduced into the intermediate water stream such as in spatial gap (140). The iron-rich water leaves stage one (110) and enters stage two (120) where the iron is adsorbed by material B. Adsorbent material B can be, for example, iron oxide ($Fe_3O_4$) particles supported on, for example, either activated carbon or γ-alumina honeycomb. The water then leaves stage two as a treated water effluent (150) having significantly lowered levels of heavy metals and Fe.

In embodiments, the filter article can have an optional chamber, for example, before (105), after (107), between (109), or a combination thereof, with respect to each of the first stage (110) and the second stage (120). In embodiments, the optional chamber(s) can be, for example, vacant, or can be occupied by a flow control material that can redistribute the liquid flow within and through the article, such as with a static mixing packing.

The carbon based honeycomb adsorbents can be prepared according to the aforementioned commonly owned and assigned application U.S. Ser. No. 13/927,857, and U.S. Ser. No. 14/252,174, from a substantially homogeneous mixture made by blending, according to conventional methods, the four main ingredients: an organic filler material; an iron compound(s); a binder selected from cellulose ethers; and a resinous binder. The activated carbon supported NZVI or iron oxide honeycomb is prepared in a one-step process that involves pyrolyzing the extruded body to carbonize and activate the carbon precursor and convert the iron compound into elemental iron ($Fe^0$) or iron oxide depending on the heat treatment applied. The alumina supported iron oxide particles (FeOX-AA) can be prepared by at least two methods. In one method, the extrusion batch compositions for alumina honeycombs, such as described in U.S. Pat. No. 6,677,261, can be modified by adding an iron precursor material such as an Fe (II) salt (e.g., Fe (II) oxalate), Fe (III) salt (e.g., Fe $(NO_3)_3$, and iron oxide) and then extruding and firing the extrudate according to the methods described in U.S. Pat. No. 6,677,261. In a second method, iron oxide particles can be deposited in the pores and on the walls of extruded alumina honeycomb by conventional impregnation methods, such as wash coating.

To evaluate and quantify the effectiveness of the disclosed two-stage adsorbent bed in removing heavy metals and dissolved and particulate iron, an adsorption column was separately packed with adsorbent A and B, and the tap water or mixed metal iron solution was passed through the column at a flow rate of 100 mL/min. For comparison, a column containing only adsorbent A was tested under identical test conditions.

EXAMPLES

The following Examples demonstrate making, use, and analysis of the disclosed filter and methods in accordance with the above general procedures.

Example 1

Iron Leaching 5.0 g activated carbon supported ZVI nanoparticles (Fe-AC) was packed inside a fixed bed adsorption column. A fixed bed adsorption column is a column in which the adsorbent material is held in place and does not move relative to the fluid. Tap water was pumped, using a peristaltic pump, through the column at flow rate of 100 mL/min. The effluent water was sampled (8 mL) at 10 min intervals. The concentration of iron in the influent and effluent water was measured by ICP-MS and compared. Table 1 shows the concentration of iron in the effluent water of adsorption column with no iron-removing media. It can be seen that a significant amount of iron was leached into the water, far exceeding EPA's maximum contaminant level (MCL) of Fe in drinking water (i.e., 300 ppb). The excessive presence of iron in the effluent water resulted in the yellow-orange discoloration of the water.

Referring to the Tables, Table 1 provides the iron concentration of an effluent water of an adsorption column (as defined above) without an iron-removing media as a control.

TABLE 1

Iron concentration in the effluent water of adsorption column without iron-removing media.

| Adsorption time | Iron concentration (ppb) |
|---|---|
| 0 min Control - tap water | Less than 5 |
| 10 min | 1450 |
| 20 min | 429 |
| 30 min | 487 |
| Total processed volume (3000 mL) | 2650 |

Example 2

Iron Leaching and Re-Absorption by Activated Carbon Supported Iron Oxide Particles (FeOX-AC)

A first stage of 5.0 g activated carbon supported ZVI nanoparticles (Fe-AC), and a second stage of 5.0 g activated carbon supported $Fe_3O_4$ (FeOX-AC) were separately packed in a fixed bed adsorption column and tested under identical conditions as Example 1. The results of the test are presented in Table 2, which provides the iron concentration in the effluent water after a two-stage adsorbent bed containing activated carbon-$Fe_3O_4$ (FeOX-AC) as an iron removing adsorbent. From the results in Table 2 one can conclude that the second stage FeOX-AC adsorbent was effective in removing the iron that was leached out from the first stage (stage one), with the iron concentration in the effluent water significantly reduced below the EPA's MCL of Fe in drinking water (300 ppb). The effectiveness of the adsorbent in removing iron was further confirmed by the clarity of the effluent water, which was colorless, and which compares very well with the clarity of tap water.

TABLE 2

Iron concentration in the effluent water from a two-stage adsorbent bed containing activated carbon-$Fe_3O_4$ (FeOX-AC) as an iron removing adsorbent.

| Adsorption time | Iron concentration (ppb) |
|---|---|
| 0 min Control - tap water | Less than 5 |
| 10 min | 28 |
| 20 min | 75 |
| 30 min | 70 |
| Total processed volume (3000 mL) | 43 |

Example 3

Iron Leaching and Re-Absorption by Activated Alumina Supported Iron Oxide (FEOX-AA)

The iron leaching and re-absorption test was the same as in Example 2 except that the second stage FeOX-AC adsorbent was replaced by iron oxide particles supported on activated alumina (FEOX-AA adsorbent). The results of the test are tabulated in Table 3. Table 3 provides the iron concentration in the effluent water after a second stage adsorbent bed containing γ-alumina-$Fe_3O_4$ as an iron removing adsorbent. The results support the conclusion that the second stage (FEOX-AA) adsorbent was as effective as the second stage iron oxide particles supported on activated carbon honeycomb (FeOX-AC) adsorbent in removing the iron that was leached out (i.e., exchanged) from the first stage. The iron concentration in the final effluent water was significantly reduced below the EPA's MCL of iron in drinking water (300 ppb). The color of the effluent water was about the same as that of Example 2, that is colorless.

TABLE 3

Iron concentration in the effluent water from a two-stage adsorbent bed containing γ-alumina-$Fe_3O_4$ as an iron removing adsorbent.

| Adsorption time | Iron concentration (ppb) |
|---|---|
| 0 min Control - tap water | Less than 5 |
| 10 min | 187 |
| 20 min | 34 |
| 30 min | 27 |
| Total processed volume (3000 mL) | 29 |

Example 4

Heavy Metal Adsorption Performance of the Two-Stage Adsorbent Bed

The metal removal performance of the two-stage adsorbent bed was evaluated in a column adsorption test using a mixed metal ion solution as the source of contaminated water. The test solution was prepared by spiking tap water with measured amounts of selected heavy metal salts (control). The test solution was passed through the adsorption column at a flow rate of 100 mL/min using a peristaltic pump. The adsorption time was 15 minutes. The concentration of residual individual heavy metal in the effluent water was measured by ICP-MS. The adsorption test results are tabulated in Table 4. Table 4 provides the concentration of toxic metals in the effluent water after a two-stage adsorbent bed containing Fe nanoparticles supported on activated carbon honeycomb (Fe-AC) in the first stage and $Fe_3O_4$ nanoparticles supported on activated carbon honeycomb (FeOX-AC) in the second stage. The adsorption test results support the conclusion that the two-stage adsorbent bed was effective in removing both heavy metals and iron.

TABLE 4

Toxic metal concentration in the effluent water after a two-stage adsorbent bed containing Fe nanoparticles on activated carbon honeycomb (Fe-AC) and $Fe_3O_4$ nanoparticles on activated carbon honeycomb (FeOX-AC).

| Sample ID | Metal concentration (ppb) | | | | | | | |
|---|---|---|---|---|---|---|---|---|
| | As | Cd | Cr | Cu | Se | Hg | Pb | Fe |
| Control | 29 | 27 | 150 | 3000 | 110 | — | 160 | <50 |
| First stage Fe-AC + Second stage FeOX-AC | 10 | 9 | 52 | 120 | 80 | — | <50 | <50 |

Example 5

Preparation of the First Stage of the Filter Article Having a First Adsorbent Including an Activated Carbon Honeycomb Infused with a Plurality of Zero Valent Iron Nanoparticles ("Fe-AC")

A feedstock mixture was prepared by mixing the components listed in Table 5. The feedstock mixture was extruded into a honeycomb shape and dried at 90° C. for 5 hrs. The extrudate was subsequently heat treated for 5 hrs at 750° C. under a nitrogen atmosphere. The sample was then cooled to room temperature under a nitrogen atmosphere to prevent oxidation. X-ray diffraction (XRD) analysis was performed to determine the crystalline phases present in the sample. The result showed that the primary phase is elemental iron (i.e., $Fe^\circ$), with small amounts of FeO and FeC in the final product. A size calculation based on the XRD data indicated a particle size of about 160 nm for the zero-valent iron nanoparticles.

TABLE 5

Feedstock Composition for Fe-AC Adsorbent.

| Material | Weight (%) | Weight (g) |
|---|---|---|
| A: Carbon/Transition Metal Feedstocks | | |
| Activated Carbon - BL (1200 cm²/g) | 14.6% | 122.04 |
| Wood Flour | 14.2% | 118.80 |
| Iron (II) Oxalate | 31.2% | 260.64 |
| Total A | 60.1% | 501.48 |
| B: Solid Binders/Organics | | |
| Sodium Stearate - LIGA | 0.6% | 5.04 |
| Hydroxypropyl Methylcellulose - A4M | 3.0% | 25.20 |
| Total B | 3.6% | 30.24 |
| C: Liquid Additions During Dry Blending | | |
| Mineral Oil | 0.9% | 7.20 |
| Phenolic Resin - GP | 35.4% | 295.20 |
| Total C | 36.3% | 302.40 |
| TOTAL | 100% | 834.12 |

Example 6

Preparation of the Filter Article Having the First Stage Prepared in Example 5 and a Second Stage Having a Second Adsorbent of Iron Oxide Particles Supported on Activated Carbon ("FEOX-AC")

A feedstock mixture was prepared by mixing the components listed in Table 6. The feedstock mixture was extruded into a honeycomb shape and dried at 90° C. for 5 hrs. The extrudate was subsequently heat treated for 5 hrs at 600° C. under a nitrogen atmosphere. The sample was then cooled to room temperature under a nitrogen atmosphere to prevent oxidation. X-ray diffraction (XRD) analysis was performed to determine the crystalline phases present in the sample and the distribution of iron particles in the carbon matrix. The result showed that the primary phases were graphite and $Fe_3O_4$, with no significant presence of $Fe^0$ in the final product.

TABLE 6

Feedstock Composition for FEOX-AC.

| Material | Weight (%) | Weight (g) |
|---|---|---|
| A: Carbon/Transition Metal Feedstocks | | |
| Iron (II) Oxalate | 31.0% | 359.93 |
| Walnut shell | 14.2% | 165.19 |
| Graphite | 13.9% | 160.82 |
| Total A | 59.2% | 685.94 |
| B: Solid Binders/Organics | | |
| Sodium Stearate - LIGA | 0.6% | 7.44 |
| Hydroxypropyl Methylcellulose - A4M | 2.9% | 34.13 |
| Total B | 3.5% | 41.57 |
| C: Liquid Additions During Dry Blending | | |
| Phosphoric Acid | 1.4% | 16.63 |
| Mineral Oil | 0.7% | 8.31 |
| Phenolic Resin | 35.1% | 406.97 |
| Total C | 37.3% | 431.91 |
| TOTAL | 100% | 1159.42 |

Example 7

Preparation of the Filter Article Having the First Stage Prepared in Example 5 and a Second Stage Having a Second Adsorbent of Iron Oxide Particles Supported on Activated Alumina ("FeOX-AA")

A feedstock mixture was prepared by mixing the components listed below in Table 7. The feedstock mixture was extruded into a honeycomb shape and dried at 90° C. for 5 hrs. The extrudate was subsequently heat treated for 4 hrs at 600° C. in air. The sample was then cooled to room temperature. X-ray diffraction (XRD) analysis was performed to determine the crystalline phases present in the sample The result showed that the primary phases were γ-alumina and $Fe_3O_4$ in the final product.

TABLE 7

Feedstock Composition for FEOX-AA.

| Material | Weight (%) | Weight (g) |
|---|---|---|
| A: Alumina/Iron oxide Feedstocks | | |
| Gamma alumina | 49% | 515.48 |
| Boehmite-15N | 20% | 210.4 |
| Iron nitrate nonahydrate | 25% | 263 |
| Total A | 94% | 988.88 |
| B: Solid Binders/Organics | | |
| Hydroxypropyl Methylcellulose - A4M | 5.0% | 52.6 |
| Total B | 5% | 52.6 |
| C: Liquid Additions During Dry Blending | | |
| Mineral Oil | 1.0% | 10.52 |
| Total C | 1.0% | 10.52 |
| TOTAL | 100% | 1050 |
| Super-addition of Water | 40% | 420 |

Example 8 (Prophetic)

Preparation of the Filter Article Having the First Stage Prepared in Example 5 and a Second Stage Having a Second Adsorbent Consisting of a Combination of Iron Oxide Particles Supported on Activated Carbon ("FEOX-AC") and Iron Oxide Particles Supported on Activated Alumina ("FeOX-AA")

A feedstock mixture is prepared by mixing the components listed in Table 7 and the components listed in Table 8. The feedstock mixture is extruded into a honeycomb shape and dried at 90° C. for 5 hrs. The extrudate is subsequently heat treated for 4 hrs at 600° C. in air. The sample is then cooled to room temperature. X-ray diffraction (XRD) analysis is expected to determine crystalline phases in the sample that resemble a mixture of iron oxide particles supported on activated carbon ("FEOX-AC") and iron oxide particles supported on activated alumina ("FeOX-AA").

The disclosure has been described with reference to various specific embodiments and techniques. However, it should be understood that many variations and modifications are possible while remaining within the scope of the disclosure.

What is claimed is:

1. A liquid filter article, comprising:
a housing having an inlet, an outlet, and an adsorbent bed there between, the bed comprising:
a first stage having a first adsorbent, the first adsorbent including an activated carbon honeycomb infused with a plurality of zero valent iron nanoparticles; and
a second stage having a second adsorbent, the second adsorbent being selected from iron oxide particles supported on activated carbon honeycomb, iron oxide particles supported on activated alumina honeycomb, or a combination thereof, wherein the first stage is in fluid communication with the second stage.

2. The article of claim 1 wherein the iron oxide particles in the second stage are magnetite.

3. The article of claim 1 wherein the plurality of zero valent iron nanoparticles is from 15 to 40 wt % based on the total weight of the activated carbon honeycomb in the first stage.

4. The article of claim 1 wherein the iron oxide particles supported on the activated carbon honeycomb in the second adsorbent is present in from 20 to 40 wt % based on the total weight of the activated carbon honeycomb.

5. The article of claim 1 wherein the iron oxide particles supported on the activated alumina honeycomb in the second adsorbent is present in from 20 to 40 wt % based on the total weight of the activated alumina honeycomb.

6. The article of claim 1 wherein the fluid communication between the first stage and the second stage is direct physical contact between the first and second stage.

7. The article of claim 1 wherein the fluid communication between the first stage and the second stage is indirect and having an enclosed spatial gap (140) between the first and second stage.

8. The article of claim 1 further comprising a flow control material that redistributes the liquid flow into the article, through the article, exiting the article, or a combination thereof, and the flow control material being disposed in the article: before, after, between, or combinations thereof, with respect to the first stage and the second stage.

9. The article of claim 8 wherein the flow control material has a high surface area of from 300 to 4,000 $m^2$ per gram, and the flow control material being selected from a fiber, a mesh, a honeycomb with or without blocked channels, a static mixing packing, or a combination thereof.

10. A method of removing heavy metals from water using the filter article of claim 1, comprising:
contacting the first stage of the filter and a water influent having at least one heavy metal contaminant present; and
contacting the effluent of the first stage of the filter and the second stage of the filter.

11. The method of claim 10 wherein contacting the first stage of the filter and the water influent having at least one heavy metal contaminant removes the at least one heavy metal contaminant from the water.

12. The method of claim 10 wherein contacting the effluent of the first stage of the filter and the second stage of the filter removes exchanged iron from the effluent of the first stage.

13. The method of claim 10 wherein at least one heavy metal contaminant is selected from cadmium, chromium, copper, lead, mercury, nickel, zinc, semi-metals, or a combination thereof.

14. The method of claim 10 wherein contacting the first stage of the filter and the water influent, and contacting the effluent of the first stage of the filter and the second stage of the filter comprises providing relative motion between the filter and the water influent and the effluent.

15. The method of claim 10 wherein contacting the first stage of the filter and the water influent, or contacting the effluent of the first stage of the filter and the second stage of the filter comprises relative motion between the filter and the water.

16. The method of claim 10 wherein contacting the first stage of the filter and the water influent comprises relative motion between the filter and the water selected from at least one of:
actively pumping the water influent through the first stage;
actively vacuuming the water influent through the first stage;
passively passing the water influent through the first stage;
moving the filter article through the water influent;
osmotic or reverse osmotic processes;
or combinations thereof.

* * * * *